(12) United States Patent
Kiyomoto

(10) Patent No.: US 7,017,182 B2
(45) Date of Patent: Mar. 21, 2006

(54) METHOD OF SECURELY TRANSMITTING INFORMATION

(76) Inventor: Shoichi Kiyomoto, 2-11, 2-Chome, Megurohonchuo, Meguro-ku, Tokyo (JP) 152-0002

( * ) Notice: Subject to any disclaimer, the term of this patent is extended or adjusted under 35 U.S.C. 154(b) by 786 days.

(21) Appl. No.: 09/766,956

(22) Filed: Jan. 22, 2001

(65) Prior Publication Data

US 2001/0023483 A1   Sep. 20, 2001

(30) Foreign Application Priority Data

Feb. 8, 2000   (JP)   .............................. 2000-029938

(51) Int. Cl.
*H04L 9/32*   (2006.01)
*H04K 1/00*   (2006.01)

(52) U.S. Cl. ......................................... 726/5; 713/186
(58) Field of Classification Search ................ 713/201, 713/186, 168, 171, 175; 382/115; 380/30; 726/5

See application file for complete search history.

(56) References Cited

U.S. PATENT DOCUMENTS

| | | | | |
|---|---|---|---|---|
| 5,541,994 | A | * | 7/1996 | Tomko et al. ............... 713/186 |
| 5,790,668 | A | * | 8/1998 | Tomko ....................... 713/186 |
| 6,185,316 | B1 | * | 2/2001 | Buffam ....................... 713/186 |

FOREIGN PATENT DOCUMENTS

| | | |
|---|---|---|
| JP | 8-171535 | 7/1996 |
| JP | 9-274431 | 10/1997 |
| JP | 11-282983 | 10/1999 |

OTHER PUBLICATIONS

Implementation of Security by Advanced Encryption Technology, Open Design, No. 14 (1996) CQ. Publication Co., Japan.
Computer Image Process (Application vol. 3, Oct. 10, 1992) Soken Shuppan Co., Ltd, Japan.

* cited by examiner

*Primary Examiner*—Matthew Smithers
*Assistant Examiner*—Courtney Fields
(74) *Attorney, Agent, or Firm*—Jeffrey C. Lew

(57) ABSTRACT

This invention developed a communication method which satisfies confidentiality to secure the contents from tapping transmission and user authentication to confirm the identification of parties involved in the communication. The communication method is implemented with the following steps: both a sender and a receiver involved in the communication deposit fingerprint information encoded from minutia of their fingerprints to a key control system; the sender sends data encrypted with his/her fingerprint information which is encoded from the minutia of the sender as the key to the key control system; the key control system decodes the encrypted data with the fingerprint information which is encoded from the minutia of the sender as the key; the key control system re-encrypts the decoded data with the fingerprint information which is encoded from the minutia of the receiver as the key, and sends the re-encrypted data to the receiver; and the receiver decodes the re-encrypted data with the fingerprint information which is encoded from the minutia of his/her fingerprint as the key.

7 Claims, 3 Drawing Sheets

METHOD OF SECURELY TRANSMITTING INFORMATION

FIELD OF THE INVENTION

This invention relates to a method for encrypting communication data/information on a computer communication network including the Internet in order to secure the contents of the data/information, and a method for exchanging data/information utilizing the encryption technology.

BACKGROUND OF THE INVENTION

The present protocol of Internet does not have an adequate secured communication network mechanism for concealing the contents of date/information to be transmitted. Data/information exchange is being performed in a plain text format, which virtually has no protection from interception, tapping, forging, and hijacking.

Plain text may be encrypted with a predetermined key before transmission. However, this scheme does not intend to secure the contents of data/information but it secures the communication line. The predetermined key is an alphanumeric code, which is vulnerable to theft. Anyone may use it to decode the encrypted text if the person has the key.

For fully securing the contents of communication, the following two conditions are very important:

1. Confidentiality to secure the contents from tapping transmission—Data integrity to prevent the data from tampering; and
2. Authentication of user involved in the communication—Non-repudiation to prevent transmission or reception from being denied by a sender or by a receiver, respectively.

Thus, utilizing encrypting technology alone is inadequate in order to establish a complete security scheme of data/information communication. Even if an extremely powerful encrypting method would be developed and a communication terminal, e.g., a personal computer, has a correct communication address of a sender and/or a receiver, a fully secured communication would not be guaranteed without user authentication to verify that the sender is the actual individual of the sending address and also the receiver is the actual individual of the receiving address.

In the prior art, a symmetric encryption key method, a public key infrastructure (PKI) method, and a non-symmetric encryption key method have been developed and some of them are being applied commercially. The first method uses a single pre-determined "key" for an encryption algorithm which both parties concerned exchange and share, whereas the last two methods use different "keys" for encryption algorithms for encoding and decoding.

These encryption methods may be applied to overcome the technological issue of security of a communication line. However, they are inadequate to guarantee the security of information exchange without verifying the individuals involved in the communication.

In law enforcement fingerprinting has been used for identifying an individual for a long time. Several encryption methods utilizing a fingerprint as the "key" were disclosed (Japanese Patent Applications 9-274431, 8-171535, and 11-282983).

However, there are some disadvantages of the fingerprint methods disclosed in the prior art. It is also well known to those skilled in the art that a fingerprint image is not always reproducible perfectly even from the same finger because acquired fingerprint images have subtle variations due to the variation of the stamping position of the finger, the physiological condition of fingerprint such as perspiration, dryness, and physical condition affected by injury and skin disease on the finger surface. By this reason, automating fingerprint identification remains as one of the most difficult tasks in this field.

SUMMARY OF THE INVENTION

The purpose of the present invention is to implement a method of data/information communication utilizing the encoded fingerprint information with the minutia of a fingerprint in order to secure the contents of the data/information, and also to provide a method for authenticating the persons involved in the communication.

The first part of the present invention discloses a method of communication, where the fingerprint information encoded with the minutia of a fingerprint of the individual concerned, is used to encrypt a plain text and to decode an encrypted text.

The second part of the present invention discloses a communication method. In this method, the fingerprint information encoded with the minutia of individuals at both sides of communication are deposited with a key control system or a trustable third party. The sender sends data/information, encrypted with the key of the sender's own fingerprint information, which is identical to the one deposited to the key control system. The key control system decodes the incoming encrypted data with the deposited sender's fingerprint information as a key, and then forwards the decoded data to the receiver after re-encrypting the data with another key of another finger print information deposited by the receiver. Then, a receiver decodes the received data with the key of the receiver's own fingerprint information which was encoded with the minutia of the receiver's own fingerprint and identical to the one deposited to the key control system. During the course of the process, the fingerprint image data are not recorded but only encoded information are deposited to the key control system.

In other words, the second part of the present invention establishes a security of communication during the time of exchanging data or information which is encrypted with the keys constructed based on the fingerprint information according to the method of the first part of the present invention.

Furthermore, the second part of the present invention proposes a method for utilizing the identical fingerprint information as the ones deposited to the key control system where each fingerprint information is securely stored in a different digital storage device in order to avoid variation of fingerprint information to propagate through the communication line whenever self-verification of individuals involved in a communication operation is required.

DETAILED DESCRIPTION

Figure 3:
FIG. 3 illustrates a digitally captured fingerprint image.

As shown in FIG. 3, an acquired image of a fingerprint has "ridges" 1 which are shown as the black hill lines, and "valleys" 2 which are shown as the white lines between two adjacent ridges. It is also well known to those skilled in the art that the characteristics of individual fingerprint may be recognized by the configuration and the characteristics of "ridge endings" 4 and "bifurcations 3 (branch points)" of the ridges and the valleys. The ridge endings and the bifurcations are collectively called "minutia." Positions of the minutia 5 of a typical fingerprint image are shown as dots in FIG. 4. In this figure, the dots are connected by lines to emphasize the configuration of the minutia positions. The lines between minutia are not significant for the practice of this invention.

Figure 4:
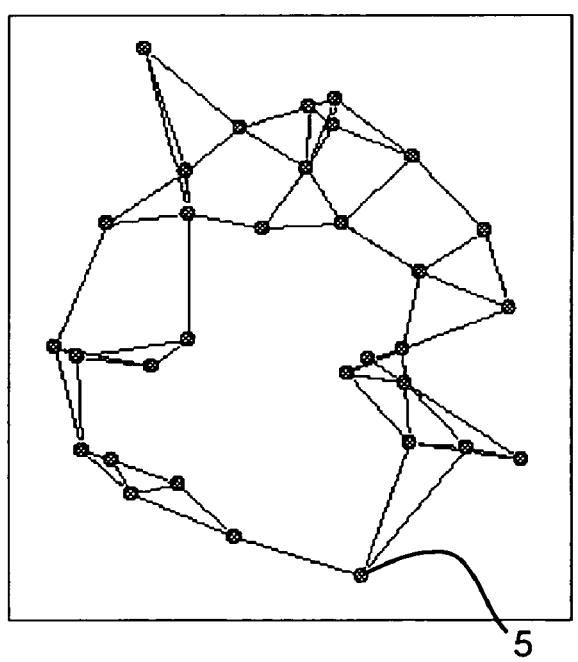
FIG. 4 shows as dots the positions of the minutia of a fingerprint image similar to that of FIG. 3.

The configuration of the minutia of a particular fingerprint is unique and will not be changed. Therefore, if fingerprint information is encoded with the configuration of the minutia as shown in FIG. 4, the aforementioned delicate variations among fingerprint images from the same finger may be prevented substantially. The fingerprint information encoded according to this method is useful for encrypting communication data/information for fully secure data/information transmission where both the data integrity and non-repudiation are to be established simultaneously. However, to the best of our knowledge, such method has not been disclosed.

The first part of the present invention may adopt various methods for extracting the minutia of a fingerprint from a digitally acquired fingerprint image. Preferably, such method is simple so that the process time is minimized without sacrificing the accuracy and precision. However, a method of the prior art requires a complicated procedure to determine the minutia (either ridge endings or bifurcations) and their directions:

each gray-scaled pixel of a digitized fingerprint image is binary-coded (black or white);

either the ridge (the black pixel line) or the valley (the white pixel line) is narrowed down to the width of a single pixel size;

the directions of either the ridge or the valley of the previous step are calculated using all pixel points of the fingerprint image; and the above narrowed-down information is correlated with the directions determined in the previous step.

The above method was published in "*Computer Image Process*" (Application Vol. 3, Oct. 10, 1992, published by Soken Shuppan, Co., Ltd.)

Another method for extracting minutia from a digitized fingerprint image was disclosed in Japanese Patent Application 10-356681. This technique comprises:

means for determining the ridges and the valleys from the digitized fingerprint image;

means for composing a list of candidates as the minutia from the ridges and the valley determined in the previous step;

means for composing a list of the minutia by focusing a pre-determined local regions surrounding each points in the list of candidates to obtain the number of ridge and valley lines which across the local region so that the directions and the confidence coefficients of the candidate points may be calculated and thus false points may be excluded from the list of candidate points.

According to this method, only local regions surrounding selected minutia are processed to calculate the directions of the minutia of a fingerprint with high accuracy and precision. This method dramatically reduces the process time while the accuracy and precision of fingerprint authentication is not scarified but enhanced.

In addition, a method for ternarizing a digitized fingerprint image as the means for determining ridges and valleys of fingerprint was implemented. In particular, in addition to the black and white description of the prior art, a "gray pixel/region" is set as a fuzzy description between black and white. The classification of a digitized fingerprint image based on the ternary levels was proposed by the inventor of the present invention. In the ternary levels, the black level may be assigned to the ridge while the white level may be assigned to the valley (Japanese Patent Application 10-356681).

According to the above method, a simplified procedure of extracting the minutia of a fingerprint from a digitized fingerprint image may be achieved by establishing the definition, calculation, and determination of the confidence coefficient of each minutiae. Furthermore, the precision of identification is also enhanced.

Preferably, a plain text may be encrypted with the fingerprint information obtained according to the aforementioned method disclosed by the author of the present invention so that a fast processing time as well as high accuracy and precision may be achieved.

After the configuration of the minutia is extracted from an image of a fingerprint, that is the positions of the minutia are determined, the configuration of minutia can be used to provide a digital encoding key. For example, the minutia can be plotted on a pixel grid of such a scale that each minutia dot is equivalent to one pixel. A scan of the grid can then be performed according to a pattern, such as a raster scan, to test every pixel in the grid once per scan to determine whether or not the tested pixel corresponds to a minutia dot. Pixels corresponding to dots, that is, dot-pixels, are associated with a bit of information having one digital value, e.g., number 1, letter "X", and positive sign. Pixels not corresponding to dots, that is non-dot pixels, are associated with a bit of information having a digital value complementary to the value of the dot-pixels, e.g., number 0, letter "O", and negative sign, respectively. The scan of the plot of minutia thus produces a digital encoding key comprising a sequence of bits of binary data.

The description of the second invention of the present invention is now explained more in detail. As anticipating from FIG. 3, a captured fingerprint image may have delicate variation due to the difference in the stamping position and the physical conditions including perspiration, dryness, skin disease, and injury.

The accuracy and precision of fingerprint identification are substantially enhanced by the aforementioned method of the inventor of the present invention. However, if fingerprint information is encoded with minutia which contain such variation, non-reproducible code of fingerprint information could be produced. The encryption of data/information with non-reproducible fingerprint information will generate a non-reproducible cryptogram. This is not desirable for data/information communication because such variation of fingerprint information propagates through the communication line, and a perfect matching will be impossible for each time.

The present invention avoids the error propagation due to the variation of the fingerprint information through a communication line by applying the following method. The contents of the communication is encrypted/decoded by the sender/receiver using the sender's/receiver's own fingerprint information which is identical to the ones deposited to the key control system in advance, respectively. The fingerprint information for encrypting and/or decoding data is securely stored in a physically separated storage medium at the site of the sender or the receiver, respectively.

Figure 1:
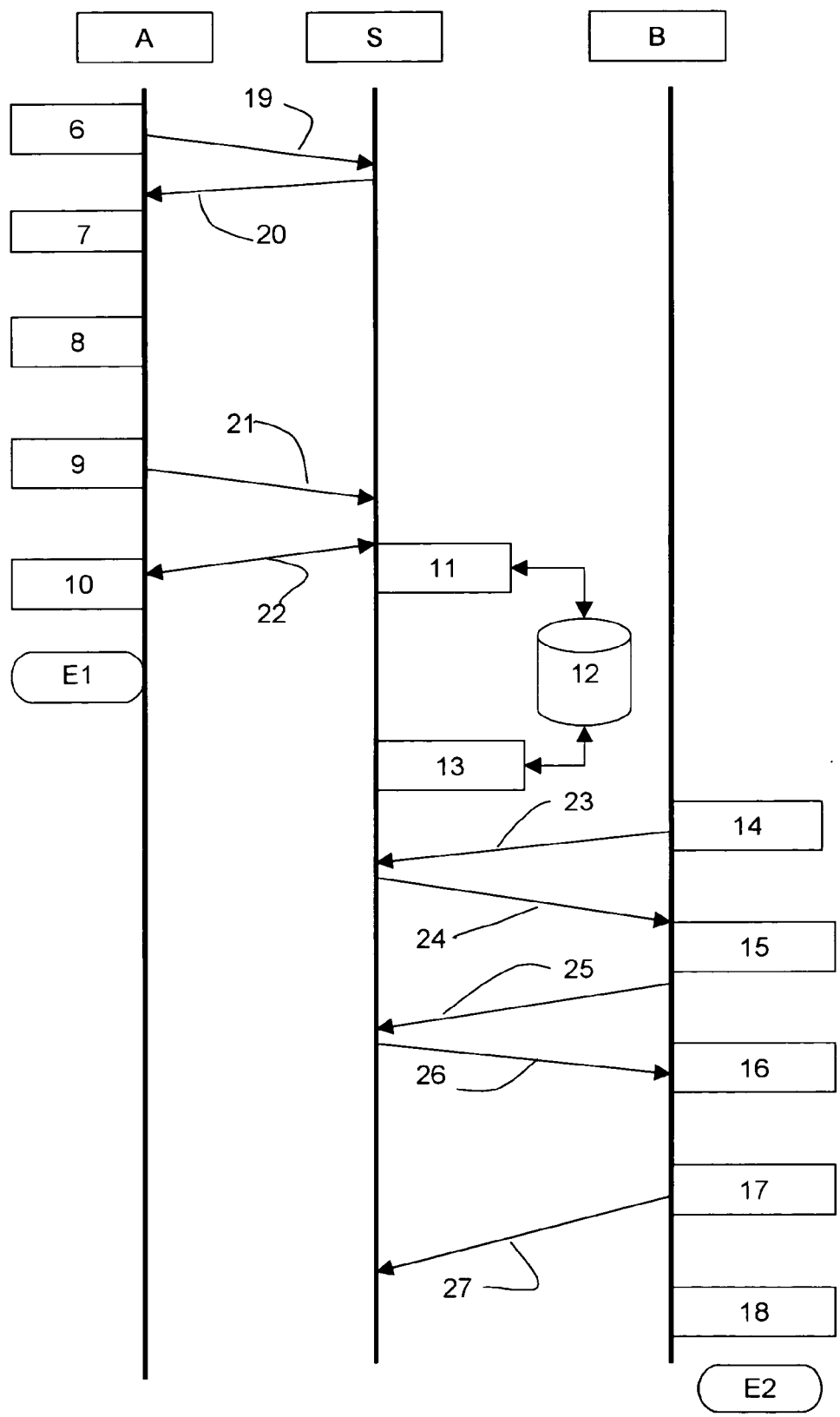
FIG. 1 shows a flow chart when the sender (A) sends data to the receiver (B) according to this invention.

Referring to FIG. 1, the procedure of the data communication process of the present invention is now described.

This Figure illustrates that the process where the sender (A) sends a plain text to the receiver (B) with the use of a key control system (S). The functions performed in each step of FIG. 1 are summarized by reference number in Table I.

TABLE I

| No. | Description |
| --- | --- |
| 6 | Start sending process |
| 7 | Verifies sender with sender's fingerprint |
| 8 | Encrypts data with pre-registered sender's fingerprint |
| 9 | Start sending encrypted data {D} |
| 10 | Waits for result after sending encrypted data |
| 11 | Decodes encrypted data with sender's key (fingerprint info.) {D}to{D'} |
| 12 | B of keys |
| 13 | Encrypts plain text data with receiver's key (fingerprint info.) {D'}to {D'} |
| 14 | Start receiving process |
| 15 | Verify receiver with receiver's fingerprint |
| 16 | Receives encrypted data |
| 17 | Issues after receiving encrypted data |
| 18 | Decods encrypted text with receiver's re-registered info. {D'}to {D} |
| 19 | Requesting to establish communication |
| 20 | Notifying establishment of communication |
| 21 | Attaching encrypted data |
| 22 | Issuing result |
| 23 | Requesting to establish communication |
| 24 | Notifying establishment of communication |
| 25 | Request sending |
| 26 | Attaching encrypted text |
| 27 | Issuing result |
| E1 | End Sender's steps |
| E2 | End Receiver's steps |

The sender (A) prepares the plain text ({D}), and then starts sending it to the "key control system" (referring to the box 6). Once the communication between the sender (A) and the "key control system" is established, the communication terminal requires the verification of the sender by his/her unique attribute such as fingerprint (referring to the box 7).

The extraction and self-verification of fingerprints were disclosed elsewhere in detail (e.g., Japanese Patent Applications 10-356681 and 11-0053728, respectively). By methods such as these a digitally captured fingerprint image (FIG. 3, for example) can be processed to generate encoded fingerprint minutia information as shown in FIG. 4 (sometimes hereinafter referred to as the "fingerprint information").

Figure 2:
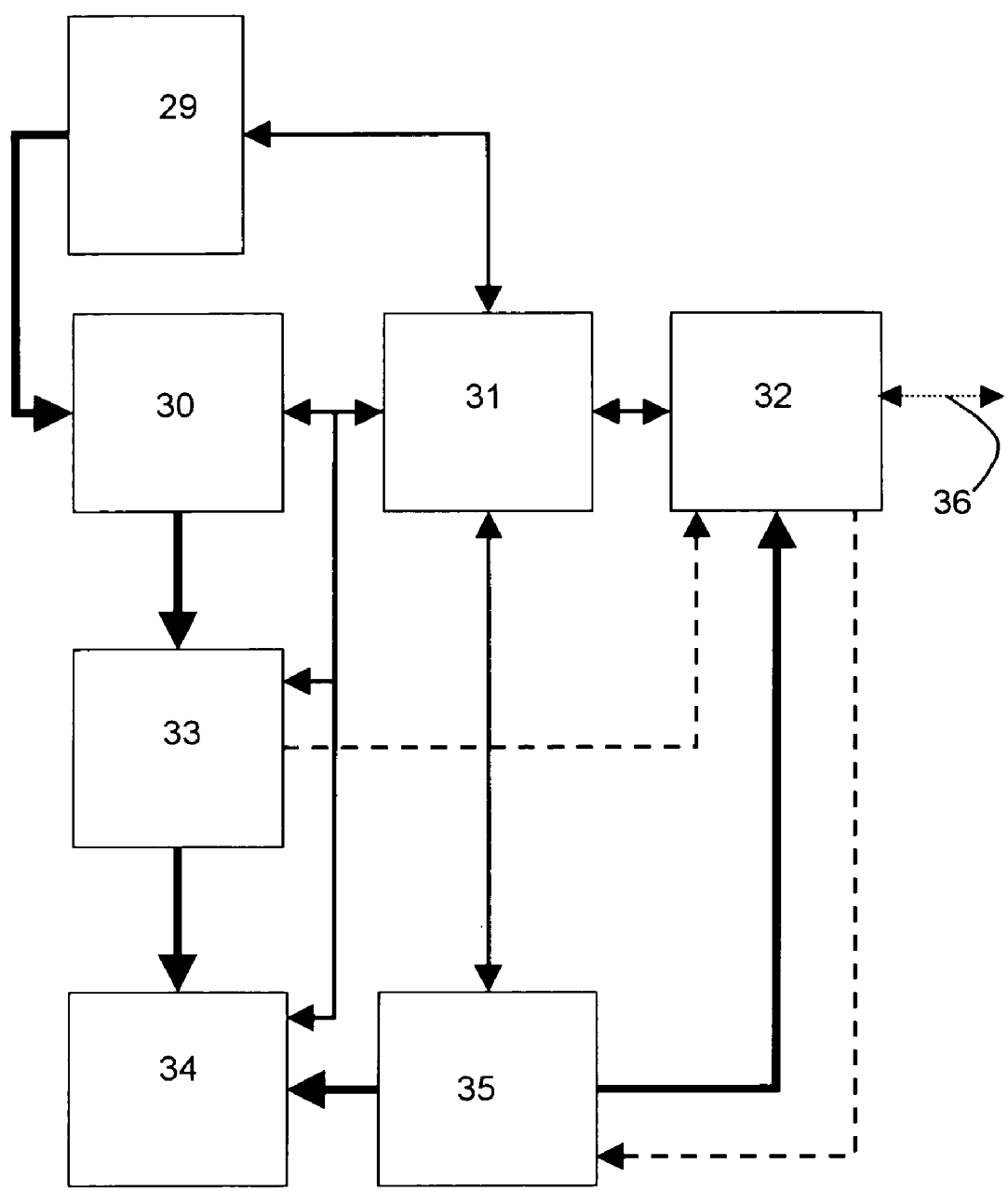
FIG. 2 is a block diagram of a fingerprint information storage/output device used in this invention.

Next, the sender (A) encrypts the plain text with one's own "fingerprint information" as the key (referring to the box 8). The determinacy of the "fingerprint" as the encryption key must be 100% at any time while actual physical condition will not reproduce the exactly the same "fingerprint information" even from the same finger. As described in the previous section, such physical condition as the stamping position and the physiological condition inevitably induces subtle differences among digitized fingerprint images. FIG. 2 shows the embodiment of the present invention to overcome this difficulty which impedes the flow of procedure from the box 7 to the box 8.

FIG. 2 is the block diagram of the specially configured apparatus for storing/outputting the encoded fingerprint information or the key. The identification of each element of FIG. 2 is summarized by the reference number in Table II.

TABLE II

| No. | Description |
| --- | --- |
| 29 | Fingerprint Image Reader |
| 30 | Finger Print Minutia Extractor |
| 31 | Central Process Unit |
| 32 | Input/Output Controller with Communication Terminal |
| 33 | Memory Buffer for Minutia of Freshly Stamped Fingerprint |
| 34 | Fingerprint Comparator |
| 35 | Fingerprint Information Storage Device |
| 36 | Link to Communication Terminal |

This apparatus for the sender (A) or the receiver (B) digitally contains the fingerprint information and the key of the sender (A) or the receiver (B), respectively. Whenever verification of the sender (A) or the receiver (B) is requested, the fingerprint information of the corresponding individual is utilized for the verification. Once the verification is established, the apparatus outputs the digitally stored key which is pre-encoded "fingerprint information" of the verified individual.

Referring to this block diagram, the sender (A) or the receiver (B) stores their own "fingerprint information" to be used as the key, respectively. When the request of the verification is instructed to the central process unit 31 by the communication terminal, the central process units 31 enables the fingerprint reading unit 29. Hereafter, we describe the verification of the sender (A), which is also applicable to the verification of the receiver (B). The sender (A) freshly stamps his/her own fingerprint in a live fashion for entering the digitized fingerprint image.

The digitized image of freshly stamped fingerprint is forwarded to the minutia extraction circuit 30. The minutia extraction circuit outputs its result to the memory buffer 33. According to the instruction of the central process unit 21, the fingerprint verification operation circuit 34 compares the minutia of the freshly stamped fingerprint, which is digitally stored in the memory buffer, with the "fingerprint information," which is digitally stored in the encoded "fingerprint information" storage medium 35, and notifies the verification result to the central process unit 31.

Once the verification is established after the above process, the central process unit 31 commands the "fingerprint information" storage medium 35 to send the data stored in the "fingerprint information" storage medium 35 to the communication terminal through the input/output control unit 32.

Also referring to FIG. 2, the thick and thin solid lines indicate the transmission paths of data and the control signal, respectively. The thick broken line indicates the non-routine transmission of signals either at the initial registration of the "fingerprint information" to the aforementioned "key control system" or at rewriting the contents of the "fingerprint information storage medium" 35. The latter process will be needed to manage rare system troubles under the supervision of the system administrator.

In other words, the "fingerprint information" storage medium 35 is a non-rewritable memory circuit, and used only for outputting the archived "fingerprint information." The minutia data extracted from the digitized image of the freshly stamped fingerprint are not sent to the storage medium 35.

Once the apparatus shown in FIG. 2 verifies the sender (A), the "fingerprint information" registered to the "key control system" of the sender (A) is read out as the key to encrypt the plain text {D} to a cryptogram {D̲} (referring to the box 8 of FIG. 1).

One preferred and simple encryption method using the "fingerprint information" as the key is to perform an Boolean algebra "exclusive OR" operation on each bit of the plain text {D} and the binary data of the digital encoding key generated by the group of minutia from fingerprint information.

The well known Boolean algebra exclusive OR operation, sometimes referred to as "XOR", with respect to two binary data sets A and B may be summarize in Table III, as follows:

TABLE III

| Data value of bit in set A | Data value of bit in set B | Result of exclusive OR operation (A XOR B) |
|---|---|---|
| 1 | 0 | 1 |
| 0 | 1 | 1 |
| 1 | 1 | 0 |
| 0 | 0 | 0 |

The bits of binary data from the minutiae of a fingerprint and Plain text {D} may be considered to correspond to A and B, respectively, and the exclusive OR operation of Table III can then be performed on each bit of plain text with the corresponding sequential bit of binary data from the minutia. This product of the XOR operation is a string of binary bits containing the plain text information encoded by the binary data from the minutia. The encrypted plain text information is not understandable in the encoded form but can be decoded to intelligible form by reversing the XOR operation, provided, of course, that the decoding entity has access to the original coding key of binary data from the minutia.

By way of simple example of the application of the exclusive OR operation to produce encoded information, assume that the binary data {FD} of the minutiae and the plain text {D} form 4 bit binary codes:

{FD}={1, 0, 0,}; and

{D}={1, 1, 0, 0}.

The plain text {D} may be encrypted with the key {FD} applying the exclusive OR operation on each bit to obtain the XOR encrypted binary data set:

{D̲}={0, 1, 0, 1}.

This encrypted text {D̲} can be decrypted by re-applying the exclusive OR operation between {D̲} and {FD}:

{D'}={1, 1, 0, 0}

The decrypted text {D'} is identical to {D} because the decryption with the exclusive OR operation is reversible.

The decoded data of minutiae may contain a "planar system of coordinates," directions and orientations, weights, and center of point group, center of gravity, the total number of the minutiae, and the classification number that classifies the overall fingerprint pattern. Suppose both the decoded minutiae data and Plain text {D} form a 256-byte binary code, the above-described exclusive OR operation may be applied between the decoded data of the minutiae and Plain text {D} bit by bit. The variation in the data length may be adjusted by repeatedly using either the "fingerprint information" or the Plain text {D}.

This operation is reversible but impossible to break the code without knowing the key. Since the contents of the key are the information extracted from a finger of a person, it is impossible to transfer to another person. Furthermore, even if the key is stolen, it is impossible to use it because the verification of the fingerprint is requested before decoding.

Another preferred encryption method is to provide each of the plain text {D} and binary data from minutia generated by a fingerprint in the form of matrices and then to multiply the two normal matrices according to an algebraic operational procedure mutually confirmed between a sender and a receiver. For decryption, a division of the two matrices may be performed to recover the original matrix corresponding to Plain Text {D}. This mutually confirmed algebraic operational may be considered as a key, and this method is also reversible.

Once a plain text {D} is encrypted to a cryptogram {D̲} by the above encryption method (referring to the box 9 in FIG. 1), the "key control system" receives the cryptogram {D̲}, and then search the key database 12 to find the fingerprint information provided by the sender A in advance. The received cryptogram {D} is decoded to another plain text {D'} with the fingerprint information searched from the key database 12 (referring to the box 11 of FIG. 1).

In the next step, the "key control system" searches the fingerprint information provided by the receiver (B) in advance from the key database 12, which is used as the key to encrypt the plain text {D'} to another cryptogram {D̲} and store the cryptogram {D̲'} (referring to the box 13 in FIG. 1).

The receiver (B) starts the receiving process (referring to the box 14 of FIG. 1) after establishing the communication line with the "key control system." Once the communication between the "key control system" and the receiver (B) is established, the communication terminal requires to verify the receiver (B) with the fingerprint information store/read only unit shown in FIG. 2 (referring to the box 15 of FIG. 1).

After verifying the receiver (B), the communication terminal sends the request of the transmission of the cryptogram {D̲'} to the "key control system." In, turn, the "key control system" forwards the cryptogram {D̲'} (referring to the box 16 of FIG. 1) to the receiver (B).

The receiver (B) receives the cryptogram {D̲'}, and then issues the status signal to the "key control system" (referring to the box 17 in FIG. 1). At the same time, the receiver (B) decodes the cryptogram {D'} to the plain text {D'} with the pre-registered "fingerprint information" of the receiver (B) as the key (referring to the box 18 of FIG. 1). The decoded plain text {D'} is identical to the original plain test {D} due to the reversibility of the encryption algorithm therein.

According to the above-described embodiment of the present invention, in a communication network such as Internet where various data or information are exchanged, several functions provided for a secured communication may be achieved to (1) prevent a third party from tapping and/or tampering;

(2) prevent the sender from denying the transmission and its contents;

(3) prevent the receiver from denying the reception and tampering the contents; and (4) provide anyone with verification that the encryption method of this invention is valid so that a full security of communication is guaranteed.

In conclusion, according to the present invention, it is possible to establish a completely secured communication method that satisfies both the confidentiality of the contents and the authentication of the persons involved in the communication at the same time by utilizing the encoded fingerprint information with the minutia.

Although specific forms of the invention have been selected for illustration in the drawings and the preceding description is drawn in specific terms for the purpose of describing these forms of the invention fully and amply for one of average skill in the pertinent art it should be understood that various substitutions and modifications which bring about substantially equivalent or superior results and/or performance are deemed to be within the scope and spirit of the following claims.

What is claimed is:

1. A method of securely transmitting information comprising the steps of
   (a) providing information to be transmitted from a first person to a second person,
   (b) obtaining a sender fingerprint of the first person and a receiver fingerprint of the second person, each fingerprint having ridge endings and bifurcations,
   (c) identifying a first configuration and a second configuration, each configuration respectively comprising positions of a plurality of the ridge endings and bifurcations in a planar system of coordinates superimposed onto the sender fingerprint and the receiver fingerprint,
   (d) the first person using the first configuration to create a first encoding key to encrypt the information thereby forming a first cryptogram,
   (e) the first person delivering the first encoding key to a key control system independent of the first person and the second person,
   (f) the second person using the second configuration to create a second encoding key,
   (g) the second person delivering the second encoding key to the key control system,
   (h) the first person transmitting the first cryptogram to the key control system,
   (i) the key control system decrypting the first cryptogram using the first encoding key as a decoding key to obtain a copy of the information;
   (j) the key control system encrypting the copy using the second encoding key as an encoding key and thereby forming a second cryptogram,
   (k) the key control system transmitting the second cryptogram to the second person,
   (j) the second person decrypting the second cryptogram using the second encoding key as a decoding key.

2. The method of claim 1 which before transmitting the first cryptogram to the key control system over a first route of transmission comprises the first person authenticating that the first route of transmission is secure from tampering.

3. The method of claim 2 in which the authenticating step comprises returning the first encoding key from the key control system to the first person and comparing the returned first encoding key with the first encoding key which had been delivered to the key control system by the first person.

4. The method of claim 1 which before transmitting the second cryptogram to the second person over a second route of transmission comprises the second person authenticating that the second route of transmission is secure from tampering.

5. The method of claim 4 in which the authenticating step comprises returning the second encoding key from the key control system to the second person and comparing the returned second encoding key with the second encoding key which had been delivered to the key control system by the second person.

6. The method of claim 1 further comprising the step of the key control system storing the first encoding key and the second encoding key in separate digital storage media.

7. The method of claim 6 in which the separate digital storage media include a non-rewritable electrical circuit.

* * * * *